Patented Oct. 9, 1934

1,976,679

UNITED STATES PATENT OFFICE 1,976,679

PRODUCTION OF DISPERSIONS

Hans Fikentscher, Hanns Wappes, Ludwig Eifflaender, Conrad Schoeller, and Alwin Schneevoigt, Ludwigshafen-on-the-Rhine, Germany, assignors to I. G. Farbenindustrie Aktiengesellschaft, Frankfort - on - the - Main, Germany No Drawing. Application May 19, 1931, Serial No. 538,618. In Germany May 26, 1930

14 Claims. (Cl. 8—6)

The present invention relates to the production of dispersions and, more particularly, of preparations for improving fibrous materials.

We have found that valuable dispersions which are particularly suitable for improving the quality of fibrous organic materials in a broad sense, such as textiles, leather, paper, cardboard and the like, can be obtained by incorporating with the substances to be dispersed water-soluble amorphous polymeric acrylic acid substances; in the treatment of the said fibrous materials equally good results are obtained by applying to the said materials the said amorphous polymeric acrylic acid substances. By the term "water-soluble amorphous polymeric acrylic acid substances" we wish to define water-soluble polymeric carboxylic acids of the acrylic acid series and their water-soluble polymeric derivatives including the complex polymerization products containing carboxyl groups, obtainable by the simultaneous condensation and polymerization of polymerizable vinyl compounds, such as styrene, chlorstyrene, indene, vinyl acetate, with the said acrylic or similar unsaturated acids, such as maleic or itaconic acids, and mixtures of the said polymeric substances. The term "amorphous" means that the polymeric substances employed do not show a definite melting point such as the well known di- or para-acrylic acids or salts thereof and are of a higher degree of polymerization, the number of molecules of monomeric compounds in the polymeric substances being apparently far above 10; these amorphous polymeric substances are obtained by direct polymerization, for example by heating, and/or with the aid of peroxides, or by the saponification of polymerized acrylic chloride, nitrile or esters with the aid of acid or alkaline agents.

In most cases the dispersion, or treatment of the fibrous materials, is carried out with aqueous dispersions of the said polymeric substances. It is to be understood, however, that the polymeric substances need not be soluble in water at any temperature but that the term "water-soluble" is meant to include also those polymeric substances which are soluble only in warm or hot water or with an addition of alkali insufficient for complete neutralization, as for example the free polymeric amorphous acids of the acrylic series, in which latter case a quantity of alkali equivalent to ⅕ of the acid value only is sufficient.

The said water-soluble polymeric acrylic acid derivatives include the salts of the acids with alkalies, ammonia, all water-soluble amines as for example alkylol amines such as mono-, di or tri-ethanol amine, and their esters, especially those with fatty acids of vegetal, i. e. animal and vegetable origin, or the ethylene polyamines, as well as the products from polymerized acrylic nitrile which have been incompletely saponified or which have been saponified with ammonia under pressure, whereby amides, cyclic imines or ammonium salts, respectively are formed. The complex polymerization products containing carboxyl groups are products in the molecules of which acrylic acid is present by reason of the polymerization of mixtures, as for example mixtures of acrylic acid and styrene or of acrylic acid and acrylic nitrile or products from the saponification by means of hydrochloric acid of a product of the polymerization of acrylic nitrile and vinyl ethers, all these acid products being soluble in aqueous alkali.

The wide field of employment of the said preparations is due to the fact that the aforesaid polymeric materials have an excellent solubility in water by reason of the numerous carboxylic groups contained in the molecule and that in consequence of the great size of their molecules their solutions have a very great viscosity and have the properties of binding an adhesive agent when in the dry state. In many cases the solutions according to the present invention are superior in these properties to solutions of glue, gelatine, gum arabic, tragacanth, British gum, casein and the like and may therefore be advantageously employed instead of the said products for all suitable purposes.

When dissolved in a little water either alone or together with other substances, as for example organic colloids such as starch, dextrin, casein, British gum, gum arabic or tragacanth, the viscous masses may serve for dispersing dyestuffs or pigments mechanically in any different degree of fineness. These masses, if desired after completely drying and redispersing in water, give highly dispersed, partly or completely colloidal solutions and pastes which may be employed as printing pastes, inks, coating preparations and the like.

Especially in the production of colloidal pastes of colouring materials, such as inorganic or organic pigments as for example vat dyestuffs or colour lakes, by rolling and/or kneading, the addition of the polymeric acrylic substances has proved highly valuable. Thus for example in the production of coloured compositions and solutions thereof by finely dispersing crystalline or coarsely dispersed dyestuffs in organic water-soluble resinous and tenacious plastic materials or in water-soluble substances which are capable of being converted into the said form, which do not flocculate out from their aqueous solutions at the temperatures necessary for the production of textile prints, in such a manner that the masses, when dissolved in solvents incapable of dissolving the dyestuffs, yield solutions which do not deposit the dyestuffs, or lakes, or at the most only deposit them to a subordinate degree even when diluted and allowed to stand for long periods of time, the polymeric acrylic substances reduce the difficulties of converting solid powders of the said nature into very viscous dispersions with starch, tragacanth and/or British gum thickenings in the production of pastes for printing textiles. The water-soluble, plastic, resinous and/or tenacious substances mentioned above are for example inspissated sulphite pulp waste liquor, alkali-casein or water-soluble artificial resins, for example the alkali salts of the alkali soluble artificial resins obtainable by the interaction of aldehydes with aromatic carboxylic acids or sulphonic acids or derivatives thereof, such as carboxylic acids of phenols or of ethers of the same, or with mixtures of phenols and aromatic carboxylic acids, or by treating phenolaldehyde condensation products with halogenated fatty acids or with phenol sulphonic acids such as naphthol sulphonic acid, or with an aromatic or aliphatic compound containing one or more easily exchangeable sulphonic groups, such as an alkali metal salt of ω-methyl-hydroxy-naphthalene sulphonic acid or the sulphur bearing compounds obtainable by the condensation of phenols or substitution products thereof such as halogenated phenols or phenol carboxylic acids with alkali metal sulphides or polysulphides. Also products which can be obtained by heating cyclic resinous substances containing oxygen, such as phenol formaldehyde condensation products of cumaron, with halogenated aralkyl sulphonic acids and the like, such as benzylchloride sulphonic acid, can be employed.

As the aqueous solutions with even small concentration of the polymeric acrylic substances possess a high viscosity, they are especially suitable for employment as thickening preparations by reason of the fact that contrasted with other thickening agents, such as gum arabic, tragacanth, British gum and the like, much less dry substance is required to produce the same viscosity. Furthermore, when employing the same amount of dyestuff or pigment, prints having better strength of colour are obtained by employing the said thickening agents than by employing the usual thickening agents, the pigments being well fixed to the substrata in such a manner that they are fast to rubbing.

The uniform and satisfactory nature of the said thickenings is of especial importance and is a great advantage contrasted with the vegetable thickening agents. Moreover, printing pastes for discharge printing, containing the polymeric materials as thickening agents, yield especially clear coloured and white discharges and at the same time render possible a saving in discharge agent.

By means of the viscous aqueous solutions, if desired with the co-employment of wetting agents or soaps, products which are not miscible with water such as hydrocarbons, as for example benzine, viscous hydrocarbon oils, vegetable or animal oils or fats may be made into emulsions, for example for impregnating, oiling or cleaning purposes, even in a semisolid state depending on the quantity of water employed. Similarly, rubber latex, varnishes, lacquers, waxes and other film-forming substances may be dispersed in water for the production of preparations for impregnating or coating textiles, leather, paper or like fibrous materials, rubber latex being simultaneously peserved for example by an addition of the sodium salt of polymeric acrylic acid.

Aqueous solutions of the said polymeric acrylic substances may be employed for dressing or sizing, but the aqueous solutions may also be employed as dispersing, emulsifying, thickening and binding agents for other water-soluble or water-insoluble agents to be applied in the treatment of the fibrous materials such as for example textiles of animal or vegetable nature. When used for impregnating, the preparations, containing the polymeric materials impart a fuller and firmer touch to the threads and fabrics than glue, gelatines, starch and similar substances, the touch becoming especially soft by the conjoint employment of organic bases. Loaded dressings and weightings may be produced by the addition of fillers, such as talc. By subsequently converting water-soluble salts of the polymeric acids into water-insoluble salts, as for example those of aluminium or the alkaline earth metals, waterproof impregnations and coatings are obtained.

The said solutions are also valuable binding agents for sizing threads, the threads being sufficiently closed so that they may be readily worked up as the warp in weaving.

The unlimited stability of the solutions and thickenings prepared with the aid of these products is of special advantage. Contrasted with the products hitherto employed, the polymerized carboxylic acids and their salts are entirely stable to acids, alkalies and bacteria.

If the fibrous materials are to be treated with aqueous solutions of the polymeric amorphous acrylic substances, for example for sizing, dressing and like purposes, the solutions will usually contain from 0.5 to 10 per cent of the polymeric amorphous acrylic substances; about the same proportions are usually employed in impregnating or water-proofing. For the production of aqueous emulsions of water-insoluble liquids from 0.5 to 20 per cent of the water-insoluble liquids may be employed, if desired in conjunction with other known emulsifying agents. In the production of printing inks and pastes and like dispersions of colouring materials the quantity of the polymeric amorphous acrylic substances employed is generally between about 5 and about 50 per cent of the colouring material but in many cases especially in printing pastes much higher quantities up to 100 or even 300 per cent of the colouring material may be useful, up to 50 per cent of the amorphous polymeric acrylic substances being replaced, if desired, by the usual thickening agents. In dyestuff pastes or powders, which are then further mixed with thickening and/or reducing agents and, if desired, organic liquid diluents for the production of printing inks or pastes are usually employed in a quantity of from 0.1 to 100 per cent of the colouring material.

The following examples will further illustrate the nature of this invention but the invention is not restricted to these examples.

*Example 1*

100 grams of Indanthrene Scarlet G (Color Index, 1924, No. 1098) (16 per cent paste) are made into a paste with 220 grams of a 10 per cent aqueous solution of the sodium salt of polymerized acrylic acid, obtainable by saponifying polymerized acrylic nitrile with 1.1 equivalent proportion of aqueous caustic soda solution at from 85 to 95° C., 330 grams of wheat starch thickening and 100 grams of glycerine and 150 grams of potassium carbonate and 90 grams of sodium formaldehyde sulphoxylate are added. The paste is printed onto a cotton fabric, steamed for 5 minutes in a Mather-Platt quick-steaming apparatus, rinsed, soaped and finished off in the usual manner. A bright orange print is obtained.

Example 2

60 grams of the sulphuric ester of the leuco compound of the green dyestuff referred to in line 1 of Table 2 of the British specification No. 193,431 are dissolved in 50 grams of thiodiglycol ($HOCH_2-CH_2-S-CH_2-CH_2OH$) and 85 grams of water and the whole is made into a paste with 700 grams of a 10 per cent aqueous solution of the triethanolamine salt of polymerized acrylic acid, obtainable by dissolving a 20 per cent aqueous jelly of polymeric acrylic acid in an equivalent quantity of triethanol amine. 40 grams of sodium chlorate dissolved in 120 grams of water, 40 grams of ammonium thiocyanate, 15 grams of ammonium vanadate dissolved in 1500 grams of water and 10 grams of 25 per cent aqueous ammonia are added. This paste is printed onto cotton, steamed, rinsed and soaped. A very fast bright green print is obtained.

Example 3

A printing discharge paste containing 50 grams of sodium formaldehyde-sulphoxylate and 950 grams of a 5 per cent aqueous solution of the sodium salt of polymerized acrylic acid is printed onto a piece of cotton material which has been previously dyed with Oxamine Pure Blue 6B (Schultz, Farbstofftabellen, 1923, No. 424) and the print is steamed for 5 minutes in a Mather-Platt apparatus, rinsed and finished off in the usual manner. The quantity of reducing agent may also be decreased to 10 grams. A dazzling white discharge on a blue ground is obtained.

Example 4

A piece of woollen material which has been dyed with Naphthol Red GR (Schultz, Farbstofftabellen, 1923, No. 166) is printed with a printing paste containing 100 grams of sodium formaldehyde-sulphoxylate, 100 grams of zinc oxide dispersed in 100 grams of water and 800 grams of a 7 per cent aqueous solution of the sodium salt of polymerized acrylic acid, steamed for 5 minutes in a Mather-Platt apparatus, rinsed and finished off in the usual manner. A dazzling white discharge on a red ground is obtained.

Example 5

A macco fabric which has been dyed is treated for 10 minutes in a bath containing per litre 100 grams of a 10 per cent solution of the incompletely saponified nitrile of polymerized acrylic acid, obtainable by acting with aqueous concentrated ammonia on polymerized acrylic nitrile at 120° C. in an autoclave. The fabric is then squeezed out without rinsing and dried. It has a full soft touch. A full, particularly soft touch is obtained by employing the salt of polymerized acrylic acid with the mono-oleic ester of triethanolamine.

Example 6

A cotton or artificial silk fabric is treated with a bath containing per litre, 30 grams of a 14 per cent aqueous solution of the ammonium salt of polymerized acrylic acid, squeezed out and passed through a second bath containing aluminium acetate in an amount corresponding to 10 grams of aluminium oxide per litre, squeezed out and dried at from 60° to 70° C. After this treatment the fabric is waterproof and has a full touch.

This method of working is especially suitable for materials which are exposed to the influences of the weather because, contrasted with impregnations which contain fillers, such as glue, starch and the like, as well as soaps, the dressing thus obtained is not destroyed.

Example 7

Skeins of viscose are treated at room temperature for 10 minutes with 15 times their weight of a bath of 75 grams of a 10 per cent aqueous solution of the diethanolamine salt of polymerized acrylic acid per litre of water, centrifuged without rinsing, shaken out well and dried. The artificial silk threads are slightly stiffened by this treatment and are smooth and elastic as well as satisfactorily closed so that they may be readily worked up as the warp in weaving. Contrasted with other sizes, such as starch, linseed oil and the like, the said size has the advantage that it is readily soluble in water so that after weaving it may be readily removed again even after having been allowed to stand for long periods of time.

Example 8

25 cubic centimetres of a 10 per cent aqueous solution of sodium di-iso-propyl naphthalene sulphonate are mixed with 75 cubic centimetres of a 10 per cent aqueous solution of the incompletely saponified nitrile of polymerized acrylic acid, 100 cubic centimetres of olive oil are added while stirring vigorously and the whole is gradually diluted with water until for example a 30 per cent oil emulsion is obtained.

In this manner much more stable emulsions are obtained than with the emulsifying agents already known alone. Contrasted with oil emulsions prepared in the usual manner by means of dispersing agents with an addition of protective colloids, the said emulsion has the advantage that no decomposition, such as occurs for example when employing glue, takes place even after being allowed to stand for long periods of time. Any settling out which may occur after standing for very long periods of time may be counteracted by shaking for a short time. An emulsion prepared in the said manner is stable to heat in contrast, for example, to emulsions which are prepared with dispersing agents and dimethyl cellulose; the latter separate out at temperatures of about 60° C.

Example 9

15 parts of the calcium compound of Lithol Fast Scarlet R (Schultz, Farbstofftabellen, 5th Edition, No. 73) are rolled in a mill into a solution of 10 parts of polymerized acrylic acid and 5 parts of mono-hydroxyethylamine in 100 parts of water until the dyestuff is dispersed homogeneously throughout the mass. By diluting this paste with 600 parts of water a solution capable of being sprayed is obtained which yields well covering red coatings when sprayed for example on to leather, and may be coated with a water resistant or water repelling finish or lacquer.

Example 10

60 parts of any coarsely disperse dyestuff powder, as for example dimethoxydibenzanthrone, 20 parts of dextrin, 10 parts of inspissated sulphite pulp waste liquor neutralized with soda, and 10 parts of the sodium salt of polymerized acrylic acid are worked with an addition of from 20 to 30 parts of water on a roller mill, preferably a friction roller mill until the desired degree of fineness is attained. The foils obtained by rolling are dried below 100° C. and then ground in a common mill or disintegrator, the powder obtained being easily dispersed in water with the formation of stable colloidal dispersions if the rolling operation be sufficiently repeated, such as after about five or six rolling operations in a friction roller mill.

Example 11

50 parts of the polymeric product containing carboxyl groups and obtained by the conjoint polymerization of 72 parts of vinyl ethyl ether and 98 parts of maleic anhydride by heating in an autoclave lined with aluminium for 12 hours to 120° C., is dissolved in a quantity of a dilute aqueous solution of sodium carbonate as is necessary for obtaining a constantly clear solution. 150 parts of 1-amino-4-anilido anthraquinone are kneaded into the viscous solution until the mixture is completely homogeneous, and a sample of the paste quickly dissolves in water with the formation of a dark coloured solution from which no solid particles are precipitated after standing for a few hours or after several days. The paste may be dried and pulverized, the powder being soluble in water in the same way as the wet paste obtained.

Example 12

60 parts of the polymeric product containing carboxylic radicles and prepared by a conjoint polymerization of 86 parts of vinyl acetate and 50 parts of maleic anhydride by refluxing the mixture at from 80° to 90° C. in the presence of a little benzoyl peroxide, is dissolved in an about 5 per cent aqueous solution of ammonia whereby a clear highly viscous product is obtained. This syrup is incorporated with 2 per cent its weight of sodium thiosulphate and 0.5 part of aqueous 10 per cent sulphuric acid whereby sulphur is precipitated. A stable emulsion of sulphur is obtained which may be employed as insecticide and for destroying pests.

Example 13

200 parts of the sodium salt of a product, containing carboxylic radicles and prepared by the conjoint polymerization of 106 parts of styrene with 50 parts of maleic anhydride by heating to about 90° C., are dissolved in 800 parts of water. Cotton, wool, or artificial silk fabrics are treated with the solution, squeezed and dried. Fabrics having a very soft dressing are obtained.

Example 14

200 parts of the ammonium salt of a product containing carboxylic radicles and prepared by the conjoint polymerization of styrene with maleic anhydride are dissolved in 800 parts of water. A fabric from artificial silk from viscose is impregnated with the solution, squeezed out, scutched, dried and scutched again. An efficiently dressed fabric is obtained.

Example 15

600 parts of a polymeric product containing carboxylic radicles and prepared by the conjoint polymerization of styrene with maleic anhydride are mixed with 400 parts of water. The mixture is a valuable thickening agent for printing pastes for printing textile fabrics.

Example 16

36 parts of the neutral sodium salt of polymerized acrylic acid are stirred into 300 parts of an oil paint consisting of 40 parts of linseed oil varnish and 60 parts of colcothar. By adding 250 parts of water an aqueous oil paint is obtained which possesses a good fluidity and may be directly applied in the same way as the so-called tempera paints. Paintings on wood or walls dry very quickly, the period of drying being reduced if desired by the addition of a drier, such as cobalt naphthenate.

Example 17

Cotton or artificial silk is treated with a solution of 5 grams of a mixed polymerization product from equal parts of acrylic acid and of vinyl ethyl ether in 1 litre of a 5 per cent aqueous solution of sodium carbonate. The fabrics are then squeezed off, passed into a solution of 15 grams of barium chloride in 1 litre of water, squeezed off again and dried at about 80° C. The fabric is thus provided with a stiff and durable dressing which is highly resistant to washing with soap solutions. In the place of the said mixed polymerization product a mixed polymerization product of 98 parts of maleic anhydride and 104 parts of styrene may be employed.

Example 18

6 parts of boiled linseed oil are emulsified in 100 parts of water in which 0.5 part of the neutral sodium salt of polymerized acrylic acid has been dissolved. Skeins of cellulose acetate silk are worked in the emulsion for 10 minutes, centrifuged without rinsing, scutched and dried. By this treatment the silk is rendered elastic, and smoothed so that it may be easily employed for the warp in weaving.

By adding cobalt naphthenate to the aforesaid emulsion a more quickly drying on the fibres is obtained. The addition of the sodium salts facilitates the subsequent removal of the dressing after weaving.

What we claim is:

1. As new compositions of matter, preparations suitable for improving fibrous organic materials, comprising a water-soluble, amorphous polymeric acrylic acid substance and a water-insoluble coloring material.

2. As new compositions of matter, preparations suitable for improving fibrous organic materials, comprising a water-insoluble coloring material and from 0.5 to 300 per cent of its weight of a water-soluble, polymeric amorphous acrylic acid substance.

3. As new compositions of matter, printing pastes comprising a water-insoluble coloring material, from 50 to 300 per cent of its weight of a water-soluble, amorphous polymeric acrylic acid substance and water.

4. As new compositions of matter, preparations suitable for improving fibrous organic materials, comprising a water-insoluble organic liquid emulsified in an aqueous solution of a water-soluble, amorphous polymeric acrylic acid.

5. As new compositions of matter, preparations suitable for improving fibrous organic materials, comprising a water-soluble, amorphous polymeric acrylic acid substance and an organic colloid.

6. As new compositions of matter, preparations suitable for improving fibrous organic materials comprising a water-soluble, amorphous polymeric acrylic acid substance, an organic colloid and water.

7. As new compositions of matter, preparations suitable for improving fibrous organic materials, comprising an organic colloid, a water-insoluble coloring material and from 0.1 to 200 percent of its weight of a water-soluble, amorphous polymeric acrylic acid substance.

8. As new compositions of matter, preparations suitable for improving fibrous organic materials, comprising a water-soluble, amorphous polymeric acrylic acid substance and a water-insoluble coloring material colloidally dispersed therein.

9. As new compositions of matter, preparations suitable for improving fibrous organic materials, comprising a water-soluble organic colloid, a water-soluble amorphous polymeric acrylic acid substance and a water-insoluble coloring material colloidally dispersed therein.

10. As new compositions of matter, preparations suitable for improving fibrous organic materials, comprising a water-soluble, amorphous polymeric acrylic acid salt, a vat dyestuff colloidally dispersed therein and water.

11. As new compositions of matter, preparations suitable for improving fibrous organic materials, comprising a water-soluble, amorphous polymeric acrylic acid salt, a color lake, colloidally dispersed therein, and water.

12. As new compositions of matter, preparations suitable for improving fibrous organic materials comprising a water-soluble amorphous substance derived from the condensation and polymerization of a vinyl compound with maleic anhydride.

13. As new compositions of matter, preparations sutable for improving fibrous organic materials, comprising a water-soluble amorphous salt of a substance derived from the condensation and polymerization of a vinyl compound with maleic anhydride.

14. As new compositions of matter, preparations suitable for improving fibrous organic materials, comprising a water-soluble alkylol-amine salt of a substance derived from condensation and polymerization of a vinyl compound with maleic anhydride.

HANS FIKENTSCHER.
HANNS WAPPES.
LUDWIG EIFFLAENDER.
CONRAD SCHOELLER.
ALWIN SCHNEEVOIGT.